United States Patent
Schmid et al.

(10) Patent No.: US 6,869,126 B2
(45) Date of Patent: Mar. 22, 2005

(54) WIPING SYSTEM FOR A WINDSCREEN OF AN AUTOMOBILE AND METHOD FOR FIXING A WINDSCREEN WIPING SYSTEM

(75) Inventors: Eckhardt Schmid, Brackenheim (DE); Bruno Egner-Walter, Heilbronn (DE)

(73) Assignee: Valeo Systèmes d'Essuyage (FR)

( * ) Notice: Subject to any disclaimer, the term of this patent is extended or adjusted under 35 U.S.C. 154(b) by 0 days.

(21) Appl. No.: 10/344,547

(22) PCT Filed: Aug. 8, 2001

(86) PCT No.: PCT/EP01/09155

§ 371 (c)(1),
(2), (4) Date: Feb. 11, 2003

(87) PCT Pub. No.: WO02/14123

PCT Pub. Date: Feb. 21, 2002

(65) Prior Publication Data

US 2004/0021335 A1 Feb. 5, 2004

(30) Foreign Application Priority Data

Aug. 11, 2000 (DE) .......................... 100 39 293

(51) Int. Cl.⁷ ................................. B60J 1/20
(52) U.S. Cl. ................... 296/96.15; 15/250.29
(58) Field of Search .................. 296/96.15–96.17; 15/97.3, 250.29, 250.44

(56) References Cited

U.S. PATENT DOCUMENTS 5,609,329 A * 3/1997 Scholl ................ 267/141
5,836,042 A * 11/1998 Funk et al. ............ 15/250.3
5,878,631 A * 3/1999 Muehlpforte et al. ..... 74/606 R
6,168,223 B1 * 1/2001 Egner-Walter ........... 296/96.17
6,364,570 B1 * 4/2002 Egner-Walter ........... 403/348
6,406,089 B1 * 6/2002 Zimmer ................ 296/192
6,513,186 B1 * 2/2003 Zimmer ................ 15/250.31
6,532,616 B1 * 3/2003 Eustache ............... 15/250.31
6,536,070 B1 * 3/2003 Fischer et al. ......... 15/250.31
6,588,047 B2 * 7/2003 Burkard et al. .......... 15/250.3

FOREIGN PATENT DOCUMENTS

FR  2 770 880  5/1999
WO  00/06429   2/2000

* cited by examiner

Primary Examiner—D. Glenn Dayoan
Assistant Examiner—Greg Blankenship
(74) Attorney, Agent, or Firm—Young & Basile, P.C.

(57) ABSTRACT

A windscreen wiping system for automobiles has a fixing device with at least three fixing mechanisms situated at a distance from each other. Two of these fixing mechanisms are situated on a connection line. The third fixing mechanism is situated at a distance from the connection line. The fixing device also includes at least three receiving devices which engage the fixing mechanisms. A damping element formed of a vibration-damping material is provided between the fixing mechanisms and the receiving devices. The damping elements are mounted on a part of the fixing device that is situated on the side of the wiping system.

20 Claims, 4 Drawing Sheets

WIPING SYSTEM FOR A WINDSCREEN OF AN AUTOMOBILE AND METHOD FOR FIXING A WINDSCREEN WIPING SYSTEM

BACKGROUND

The present invention relates to a wiping system for a windshield of an automobile with a screwless securing mechanism which has at least three securing members at a distance from each other, two of which lie on a connecting line and the third is at a distance from the connecting line, and which comprises at least three receiving devices which the securing members can engage, wherein a damping element of a vibration-damping material is furnished between at least one securing member and the corresponding receiving device.

A securing mechanism of this kind is known from DE 198 33 404 A1. The disclosed wiping system comprises a load-bearing structure on which a total of three securing members configured as cylindrical studs are provided. These securing members are located on the system-side. They are inserted axially into receiving openings which are in special holders which are attached to the vehicle body, thus on the vehicle side. To decouple vibration from the wiper system from the vehicle body, the receiving openings which are on the vehicle side are provided with rubber grommets which are infixed in matching breakthroughs in the retainers. The studs in turn are inserted into the grommets. Studs, receiving openings and rubber grommets together form the securing mechanism for the windshield wiper system.

The disadvantage with this wiper system, however, is that its installation to the vehicle is relatively time-consuming and cannot be automated.

From FR 2 770 880 A1 a wiper system with a securing mechanism is known, the two outer securing members of which are configured in the traditional manner for the use of threaded fasteners. The securing mechanism of this wiper system cannot therefore be described as screwless.

The center securing member in this reference comprises a sheet metal tongue projecting from the wiper system, on whose end, which is flanged and simply folded over on itself, a cap-like damping element is set. The damping element therefore has a planar, discontinuous recess into which the end of the sheet metal tongue projects. During installation of the wiper system to the vehicle, this end of the securing member with the damping element is simply pushed lengthwise into the receiving device furnished on the vehicle, without the securing member itself being secured against slipping out. With the configuration of the securing members of a screwless securing mechanism in the manner of the center securing member as it is known from FR 2 770 880 A1, there is a risk that the securing member can slip out when impinged upon by forces from the receiving device.

The object of the present invention is, therefore, to further improve a wiper system of the type named initially in such a way that it is possible to install it even more quickly but still securely.

SUMMARY

This object is achieved in combination with a wiper system by the damping element being attached on the wiper system-side part of the mechanism.

The measures taken in accordance with the invention are as simple as they are surprisingly effective:

In contrast to the prior art, in which the damping elements are set into the receiving devices on the vehicle side, under the invention at least one damping element is fastened to a part of the securing mechanism on the wiper system-side; it is thus connected to this system-side part even when the windshield wiper system has not yet been attached to the vehicle. The system-side part of the securing mechanism of the windshield wiper system, which is as yet not installed into the vehicle, is readily accessible, whereby attachment of the damping element can be carried out more easily, more quickly, more reliably and, if necessary, automated. The interaction of the thickened area at the end of the damping element with the receiving device makes possible a particularly secure and simple locking connection of the windshield wiper system to the vehicle without the need for any bolting operations.

Advantageous improvements to the invention are given in the dependent claims.

In one aspect of the invention, appropriate damping elements are fastened to all the wiper system-side parts of the securing mechanism. This maximizes the aforementioned time benefits.

Further, it is particularly preferred if the securing members are furnished on the wiper system-side and the receiving devices are furnished on the vehicle side and at least one securing member includes a cylindrical stud onto which the damping element is pushed. This involves a design for the securing members which is of optimally simple construction and economical of material. On the vehicle side, only cylindrical holes are necessary, which are simple to produce. The damping element can easily be pushed onto a cylindrical stud without having to consider any special radial positioning of the damping element with respect to the cylindrical stud.

In another improvement to the invention, the damping element is fastened to the securing member, specifically secured by means of a bolt. This improvement ensures that the damping element cannot become detached from the securing member during installation and also in subsequent operation.

In another improvement, the securing members are configured as studs in one piece with the wiper bearing housings, or with the motor casing or the motor mount. This reduces the expense for the production of the wiper system. Additionally, a favorable geometry regarding the attachment points is realized through this measure.

It is furthermore advantageous if the securing members configured as studs have a thickened shape at their free end, like the cap of a mushroom, in accordance with a further aspect. The damping element positioned on the pin is thereby secured against slipping down axially, and with a suitable shape for the thickened end, specifically tapering conically toward the end, it can be employed advantageously during installation of the wiper system to the vehicle as an aid to insertion into the corresponding receiver.

Preferably an annular shoulder against which the damping element bears is furnished on at least one wiper system-side component. In this way, axial positioning of the damping element with respect to the wiping system is particularly simple.

Another improvement proceeds in the same direction, in which the damping element has a collar at its end on the system-side, with which it is supported on the system-side. In addition to the advantage of secure axial positioning of the damping element with respect to the wiper system-side component, this improvement to the invention ensures dependable decoupling of wiper system vibration from the vehicle.

As was explained at the beginning, the vehicle-side receiving devices in the prior art are infixed in separate holders. This is necessary because in the prior art the rubber grommets are infixed on the vehicle side, which is economically possible only through the accessibility provided by separate holders. As a result of the damping element under the invention being attached to the wiper system-side part of the securing mechanism, this reason for a separate holder no longer exists. This is taken into account by an improvement of the invention in which at least one vehicle-side receiving device is located directly in the structural sheet metal of the vehicle.

It is particularly preferred in this arrangement if at least one receiving device on the vehicle side consists of a draw in the sheet metal. A draw of this type forms a locating bushing in which specifically a cylindrical securing member and a matching damping element can be securely retained. In addition, a sheet metal draw of this type is extremely simple to affect in a metal panel of a vehicle.

A good connection between the damping element and the wiper system-side part is achieved if the damping element is sprayed onto the system-side component.

Finally, a simple connection of the receiving device is possible if the securing member can be retained by clips to the securing device.

The present invention also relates to a method of securing a windshield wiper system to a vehicle, wherein at least three securing members at a distance from each other and at least three receiving devices are furnished which the securing members can engage. In order to make it easier to perform the procedure and to be able to automate it as required, it is proposed under the invention that first one damping element of a vibration-damping material is attached to at least one system-side component of the mechanism and then the system-side component with the damping element is inserted into or installed onto the corresponding vehicle-side component.

BRIEF DESCRIPTION OF THE DRAWING

In what follows, aspects of the inventions are explained in detail with reference to the accompanying drawing. In the drawing.

DETAILED DESCRIPTION

Figure 1:
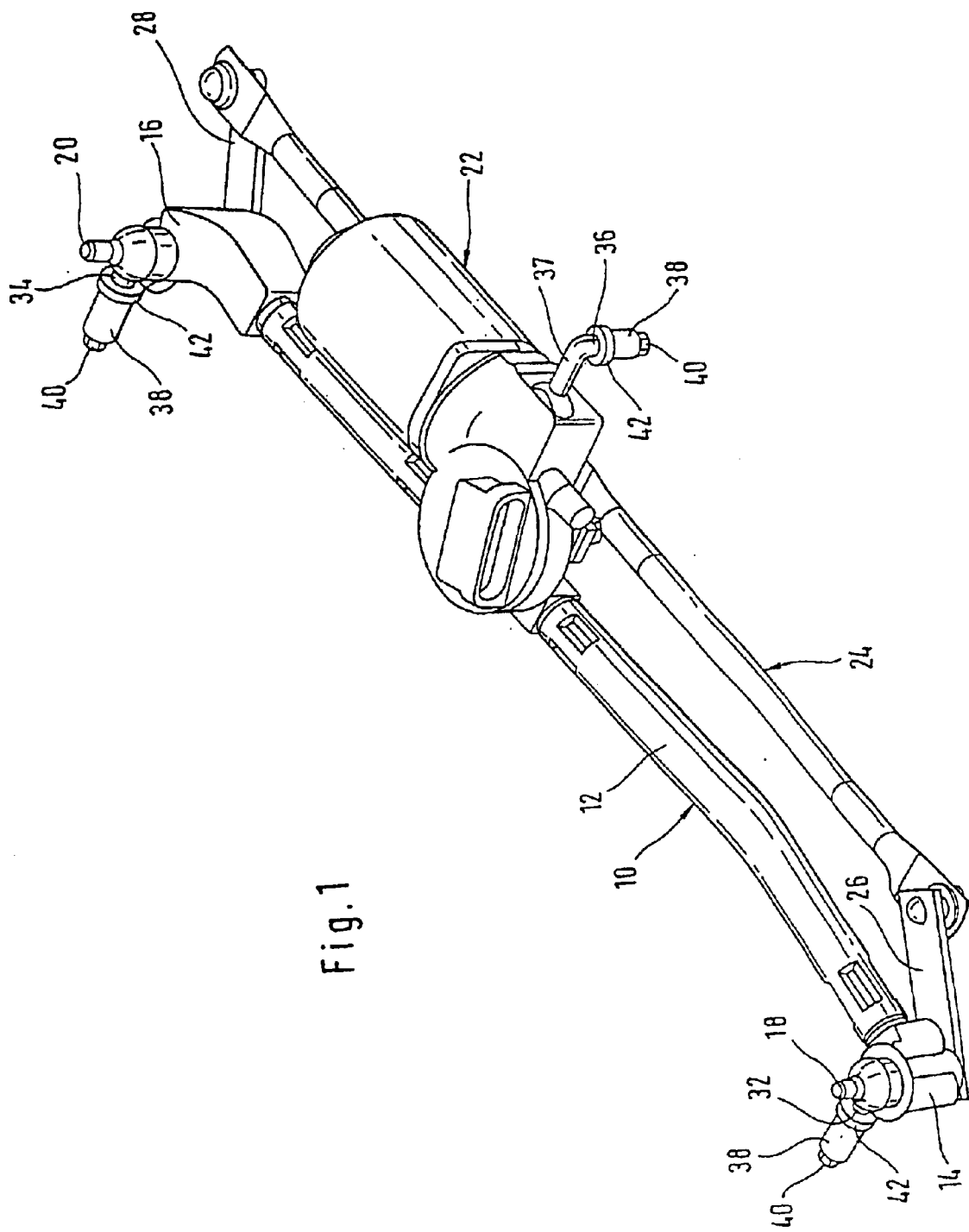
FIG. 1 is a perspective view of a windshield wiper system with the wiper system-side area of a securing mechanism.

A windshield wiper system for an automobile has the general reference numeral 10 in FIG. 1. It comprises tubular support structure 12 which has a bearing assembly 14 or 16 at each end. A wiper shaft 18 or 20 is axially secured and mounted to be rotatable in each bearing assembly 14 or 16 to receive a windshield wiper arm.

A drive device 22 which operates on a coupling linkage 24 sits approximately in the center section of the support structure 12. One end of the coupling linkage 24 is connected in an articulated manner to a crank 26, which in turn is rigidly coupled to the wiper shaft 18. The other end of the coupling linkage 24 is connected in an articulated manner to a crank 28, which is rigidly coupled to the wiper shaft 20.

The windshield wiper system 10 can be attached by means of a securing mechanism 29 with a screwless push-in connection below a windshield 30 (see FIGS. 2 and 3) of an automobile body. To this end, each bearing assembly 14, 16 carries a cylindrical stud 32, 34 which project from the bearing assemblies 14, 16 parallel to each other and in the same direction, as well as at a right angle to the wiper shafts 18 and 20. A further cylindrical stud has the reference numeral 36 and is rigidly attached to a spacer element 37 on the side of the drive device 22 facing away from the load-bearing structure 12.

While the axes of studs 32 and 34 lie approximately in the plane extended through the load-bearing structure 12 and the coupling linkage 24, the axis of stud 36 is approximately at a right angle to this plane, thus also at a right angle to the longitudinal extension of the two studs 32 and 34. Studs 32 and 34 are, in each case, a single piece with the bearing housings 14 or 16, and stud 36 forms a single piece with the casing of the drive device 22. Together, studs 32, 34 and 36 lie at the angles of a triangle and form a stable support base.

A rubber grommet is pushed onto each of the cylindrical studs 32, 34 and 36 and secured with a bolt 40 to the individual studs 32, 34 and 36. On the wiper system-side end, each rubber grommet 38 has a collar 42. This collar in turn is supported against an annular shoulder 44 (FIG. 3), which is furnished on the specific stud 32, 34 or 36 (the annular shoulder 44 on stud 36 is not shown in FIG. 1). On the other end, each rubber grommet 38 has a thickened section in the manner of a possibly retaining ring 46, which can be conical and whose purpose will be examined in what follows.

Figure 2:
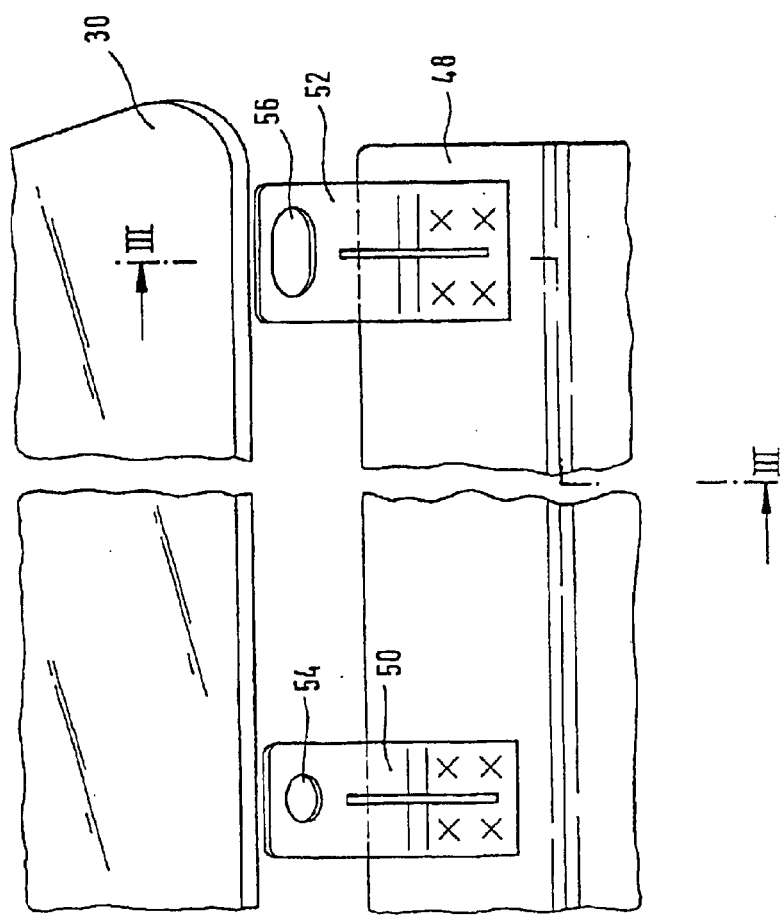
FIG. 2 shows a vehicle-side area of the securing mechanism of the windshield wiper system.
Figure 4:
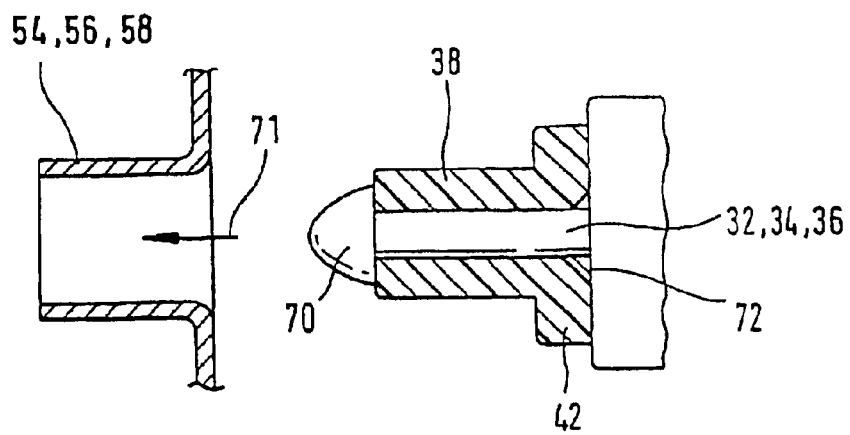
FIG. 4 shows an aspect of a securing member with the damping element pushed over it.

In the aspect in accordance with FIG. 4, in comparison to FIG. 2, in place of a bolt 40 a mushroom cap-shaped thickening is formed on the free end 70 of the particular stud 32, 34, 36, over which the thickened section rubber grommet is pushed. The thickened end 70 is tapered in the manner of a cone, where this taper still continues at the outer edge of the damping element in order to facilitate insertion of the stud 32, 34, 36 in the direction of the arrow 71 into the corresponding receiver 54, 56, 58 when the wiper device is installed to the automobile. At the opposite end, the damping element 38 has the previously described collar 42 supported against an annular shoulder 72, which is furnished on the particular stud 32, 34 or 36. In this aspect, a conical expansion/enlargement of the hole extending through the damping element 38 can be seen at this end of the damping element 38, the enlargement making it easier to push the damping element 38 over the thickened end 70.

As can be seen from FIG. 2, two holders 50 and 52 are spot welded to a structural metal panel 48 of the vehicle. A circular receiving opening 54 is introduced into the holder 50, and a receiving opening 56 configured as an elongated hole is introduced into the holder 52. Configuring receiving opening 56 as an elongated hole serves to compensate for manufacturing tolerances when positioning the holders 48 and 50 or during production of the windshield wiper system 10.

Figure 3:
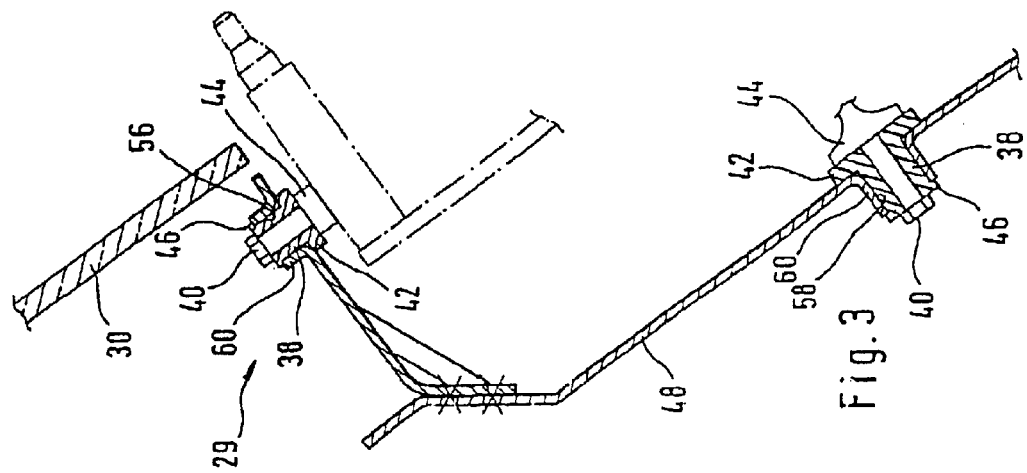
FIG. 3 shows a section along the line III—III in FIG. 2.

A further receiving opening 58 is located directly in the structural metal panel 48, as can be seen from FIG. 3. All the receiving openings 54, 56 and 58 are effected as draws in the panel, which include a cylindrical tube section 60 lying at a right angle to the plane of the structural metal panel 48 or the holders 50 and 52, respectively, the tubular section forms a bushing for the studs 32, 34 and 36 and the rubber grommets 38.

The studs 32, 34 36, the rubber grommets 38 and the receiving openings 54, 56 and 58 together form the securing mechanism 29 for the windshield wiper system 10. Installation proceeds as follows:

First, the rubber grommets 38 are pushed onto the studs 32, 34 and 36, in such a manner that they lie with their collar 42 against the annular shoulder 44 of the studs 32, 34 or 36. In the case of the aspect from FIG. 4, the rubber grommet 38 is axially secured by the mushroom cap-shaped, thickened end 70 of the stud over which it is pushed as it temporarily expands. In the aspect from FIG. 2, the bolt 40 is installed and tightened after pushing on the rubber grommet 38, whereby the rubber grommet 38 is firmly attached to the individual stud 32, 34 or 36 (alternatively, the rubber grommet could also be sprayed or vulcanized on, whereby these assembly steps are eliminated). Now the windshield wiper system 10 is brought to the installation location, and the studs 32, 34 and 36 with the pre-installed rubber grommets 38 are inserted into the receiving openings 54, 56 and 58 until the collar 42 on each rubber grommet 38 abuts the structural panel 48 or the holders 50 and 53, and, if present, the retaining ring 46 at the end of the rubber grommet 38 emerges from the tube section 60, and the rubber grommet 38 latches with each receiving opening 54, 56 or 58.

In this way, simple installation and at the same time secure retention of the windshield wiper system 10 to the vehicle is ensured, without the use of any screws.

In FIGS. 5 to 9, several aspects of "clip attachments" are shown. Parts which have the equivalent functions as previously described parts have the same reference numeral and are not described again in detail.

In the case of these clip attachments, the receiving device 54 is configured as a clamp and includes two flexible jaws 62. The width B of the jaws 62 must be matched relatively exactly to the dimension C on the damping element 38 between snap ring 46 and collar 42 on the stud 32 to prevent axial movement of the stud 32 with respect to the receiving device 54 in the installed position.

Figure 5:
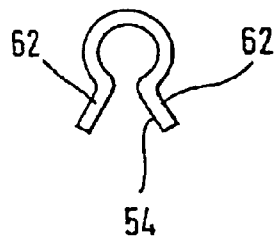
FIG. 5 shows a top view of an aspect of a receiving device.
Figure 6:
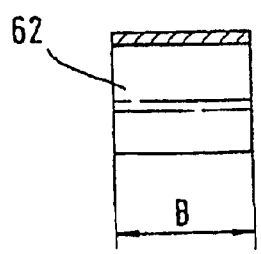
FIG. 6 shows a front elevation of the receiving device from FIG. 5 and a corresponding securing member.
Figure 6:
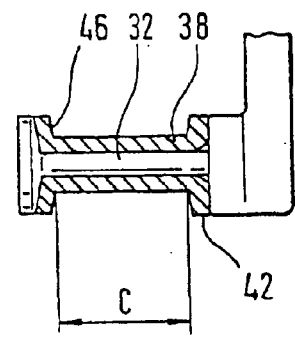
Figure 7:
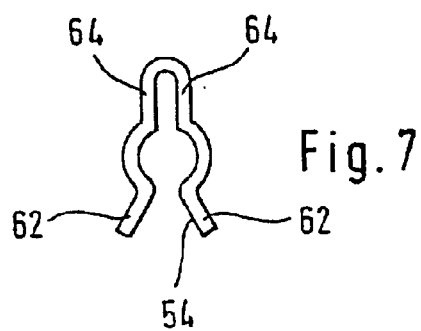
FIG. 7 shows a top view of a further aspect of a receiving device.

The receiving devices 54 in FIGS. 5 and 7 differ from each other in the design of their jaws 62, which in the case of receiving device 54 from FIG. 7 have an additional straight flexion 64 through which the flexibility and the potential opening angle of the receiving device 54 are increased.

Figure 8:
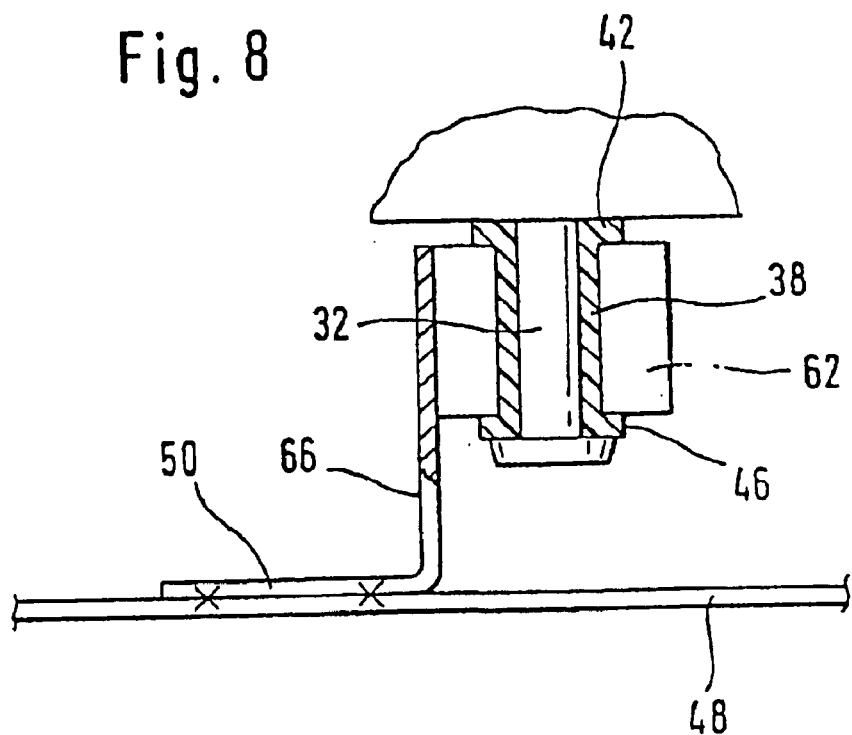
FIG. 8 shows a longitudinal section through a further aspect of a receiving device with a corresponding securing member.
Figure 9:
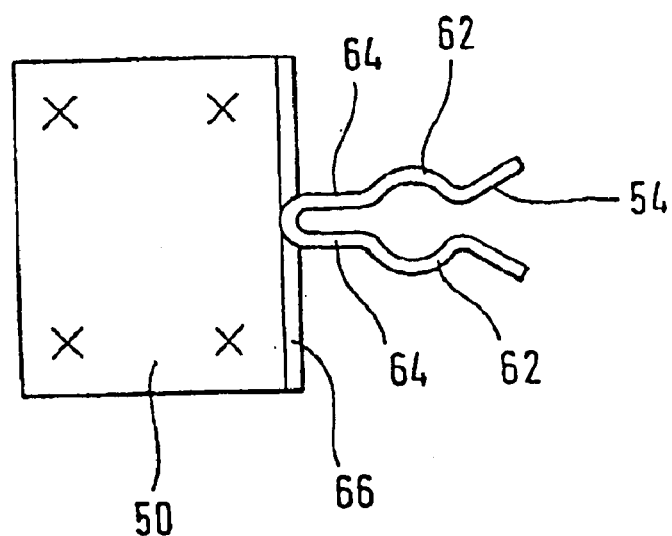
FIG. 9 shows a top view of the receiving device from FIG. 8.

An aspect of a clamp-shaped receiving device 54 is shown in FIGS. 8 and 9, which is configured in one piece with a sheet-metal holder 50 on the vehicle side. The holder 50 includes a 90° raised edge 66 which cut in its upper area is from the side, not quite as far as the middle. The sheet metal strips obtained in this way are bent such that corresponding clamping jaws 62 are formed.

The clamp-shaped receiving devices 52 have the advantage that they allow a secure latching fit with a corresponding damping element 38, and during installation of the windshield wiper system 10 to the vehicle almost unlimited installation directions are possible.

What is claimed is:

1. A wiper system for a windscreen of an automobile with a screwless securing mechanism which has at least three securing members at a distance from each other, two of which lie on a connecting line, and the third is at a distance from the connecting line, and which includes at least three receiving devices which the securing member can engage, wherein a damping element of a vibration-damping material is furnished between at least one securing member and the corresponding receiving devices, characterized in that the damping element is fixed to a wiper system-side part of the mechanism, wherein the combined fluid dampening element located on the wiper system-side part is connectible to a vehicle side-part for assembly.

2. The wiper system from claim 1, wherein damping elements are furnished on all components on the wiper system side of the securing mechanism.

3. The wiper system from claim 1, wherein the securing members are furnished on the wiper system side and the receiving devices are furnished on the vehicle side, and at least one securing member includes a cylindrical stud onto which the damping element is pushed.

4. The wiper system from claim 3, wherein the damping element is fastened to the securing member.

5. The wiper system from claim 3, wherein the studs are configured in one piece with one of the wiper bearing housing, the motor casing and the motor mount.

6. The wiper system from claim 3, wherein the free end of the stud is thickened like a mushroom cap.

7. The wiper system from claim 1, wherein an annular shoulder is provided on at least wiper system-side part of the securing mechanism, the damping element supporting itself against the shoulder.

8. The wiper system from claim 1, wherein the damping element has a collar with which it is supported on the system side.

9. The wiper system from claim 1, wherein at least one vehicle-side receiving device is located directly in the structural sheet metal of the automobile.

10. The wiper system from claim 1, wherein at least one vehicle-side receiving device includes a sheet metal draw.

11. The wiper system from claim 1, wherein the securing member can be attached to the receiving device by insertion into a clip.

12. A wiper system for a windscreen of an automobile with a screwless securing mechanism which has at least three securing members at a distance from each other, two of which lie on a connecting line, and the third is at a distance from the connecting line, and which includes at least three receiving devices which the securing members can engage, wherein a damping element of a vibration damping material is furnished between at least one securing member and the corresponding receiving devices, characterized in that the damping element is fixed to a wiper system side part of the mechanism wherein the damping element is sprayed into or onto the wiper system-side component of the securing mechanism.

13. The wiper system from claim 12, wherein damping elements are furnished on all components on the wiper system side of the securing mechanism.

14. The wiper system from claim 12, wherein the securing members are furnished on the wiper system side and the receiving devices are furnished on the vehicle side, and at least one securing member includes a cylindrical stud onto which the damping element is pushed.

15. The wiper system from claim 14 wherein the damping element is fastened to the securing member.

16. The wiper system from claim 14, wherein the studs are configured in one piece with one of the wiper bearing housing, the motor casing and the motor mount.

17. The wiper system from claim 14, wherein the free end of the stud is thickened like a mushroom cap.

18. The wiper system from claim 12, wherein an annular shoulder is provided on at the least wiper system-side part of the securing mechanism, the damping element supporting itself against the shoulder.

19. The wiper system from claim 12, wherein the damping element has a collar with which it is supported on the system side.

20. A method of securing a windscreen wiper system to an automobile with a securing mechanism comprising the steps of:

providing at least three securing members separated from each other;

providing at least three receiving devices which the securing members can engage;

fastening first one damping element of a vibration-damping material to at least one wiper system-side part of the securing mechanism; and then screwlessly inserting the wiper system-side part with the damping element into the corresponding vehicle-side part.

* * * * *